(12) United States Patent
Nguyen et al.

(10) Patent No.: US 11,313,214 B2
(45) Date of Patent: Apr. 26, 2022

(54) CREATING HIGH CONDUCTIVITY LAYERS IN PROPPED FORMATIONS

(71) Applicant: Halliburton Energy Services, Inc., Houston, TX (US)

(72) Inventors: Philip D. Nguyen, Houston, TX (US); Ronald Glen Dusterhoft, Katy, TX (US); Larry Steven Eoff, Porter, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 17/052,363

(22) PCT Filed: Aug. 10, 2018

(86) PCT No.: PCT/US2018/046303
§ 371 (c)(1),
(2) Date: Nov. 2, 2020

(87) PCT Pub. No.: WO2020/032977
PCT Pub. Date: Feb. 13, 2020

(65) Prior Publication Data
US 2021/0172308 A1 Jun. 10, 2021

(51) Int. Cl.
*E21B 43/267* (2006.01)
*C09K 8/66* (2006.01)
*C09K 8/80* (2006.01)

(52) U.S. Cl.
CPC ............ *E21B 43/267* (2013.01); *C09K 8/665* (2013.01); *C09K 8/80* (2013.01); *C09K 2208/28* (2013.01)

(58) Field of Classification Search
None
See application file for complete search history.

(56) References Cited

U.S. PATENT DOCUMENTS 6,860,328 B2 3/2005 Gonzalez et al.
7,207,386 B2 4/2007 Brannon et al.
(Continued)

FOREIGN PATENT DOCUMENTS

EP 2469020 A1 6/2012
WO 2011081549 A1 7/2011

OTHER PUBLICATIONS

International Search Report and Written Opinion dated May 1, 2019; International PCT Application No. PCT/US2018/046303.

*Primary Examiner* — Andrew Sue-Ako
(74) *Attorney, Agent, or Firm* — McGuireWoods LLP

(57) ABSTRACT

Provided are methods and system for propping a fracture. An example method includes introducing a first fracturing fluid into the fracture; wherein the first fracturing fluid comprises a first amount of high crush strength proppant and a first aqueous base fluid; wherein the high crush strength proppant has a crush strength equal to or exceeding 4000 psi. The method further includes introducing a second fracturing fluid into the fracture; wherein the second fracturing fluid comprises a first amount of low crush strength proppant and a second aqueous base fluid; wherein the low crush strength proppant has a crush strength less than 4000 psi. The method also includes introducing a third fracturing fluid into the fracture; wherein the third fracturing fluid comprises a second amount of high crush strength proppant and a third aqueous base fluid.

20 Claims, 5 Drawing Sheets

(56) References Cited

U.S. PATENT DOCUMENTS

| | | | |
|---|---|---|---|
| 7,210,528 B1 | 5/2007 | Brannon et al. | |
| 7,472,751 B2 | 1/2009 | Brannon et al. | |
| 7,708,069 B2 | 5/2010 | Watters et al. | |
| 8,936,083 B2 | 1/2015 | Nguyen | |
| 2006/0177661 A1* | 8/2006 | Smith | C04B 35/14 |
| | | | 428/403 |
| 2014/0262291 A1 | 9/2014 | Chen et al. | |
| 2015/0101808 A1 | 4/2015 | Saini et al. | |
| 2015/0315892 A1* | 11/2015 | McDaniel | E21B 43/267 |
| | | | 166/280.2 |
| 2017/0190959 A1* | 7/2017 | Reddy | E21B 43/267 |
| 2018/0016489 A1 | 1/2018 | Suzart et al. | |
| 2018/0030333 A1 | 2/2018 | Nguyen et al. | |
| 2018/0044577 A1 | 2/2018 | Nguyen et al. | |
| 2018/0051203 A1 | 2/2018 | Nguyen et al. | |
| 2018/0066179 A1 | 3/2018 | Nguyen et al. | |

* cited by examiner

CREATING HIGH CONDUCTIVITY LAYERS IN PROPPED FORMATIONS

TECHNICAL FIELD

The present disclosure relates generally to fracturing operations, and more particularly, to creating high conductivity layers of high crush strength proppant within a fracture or fracture network while also using larger amounts of low crush strength proppant to prop the fracture.

BACKGROUND

Hydraulic fracturing is a well stimulation technique designed to enhance the production of hydrocarbons from a well by creating conductive fractures in a producing formation. The fracturing process typically involves injecting fracturing fluids down a perforated wellbore at a pressure greater than the fracture gradient of the target producing formation. To prevent the fractures from closing once the fracturing pressure is released, a particulate material, known as a propping agent or proppant, is dispersed throughout the fractures by the fracturing fluid. Once the fracturing pressure is released, the fracturing fluid leaks off into the surrounding formation or wellbore, and the fracture closes about the proppant. The proppant maintains the fracture opening by resisting the fracture stresses attempting to close the fracture. Provided are improved methods and systems for propping and maintaining permeability within a fracture and fracture network.

BRIEF DESCRIPTION OF THE DRAWINGS

Illustrative examples of the present disclosure are described in detail below with reference to the attached drawing figures, which are incorporated by reference herein, and wherein.

Figure 1:
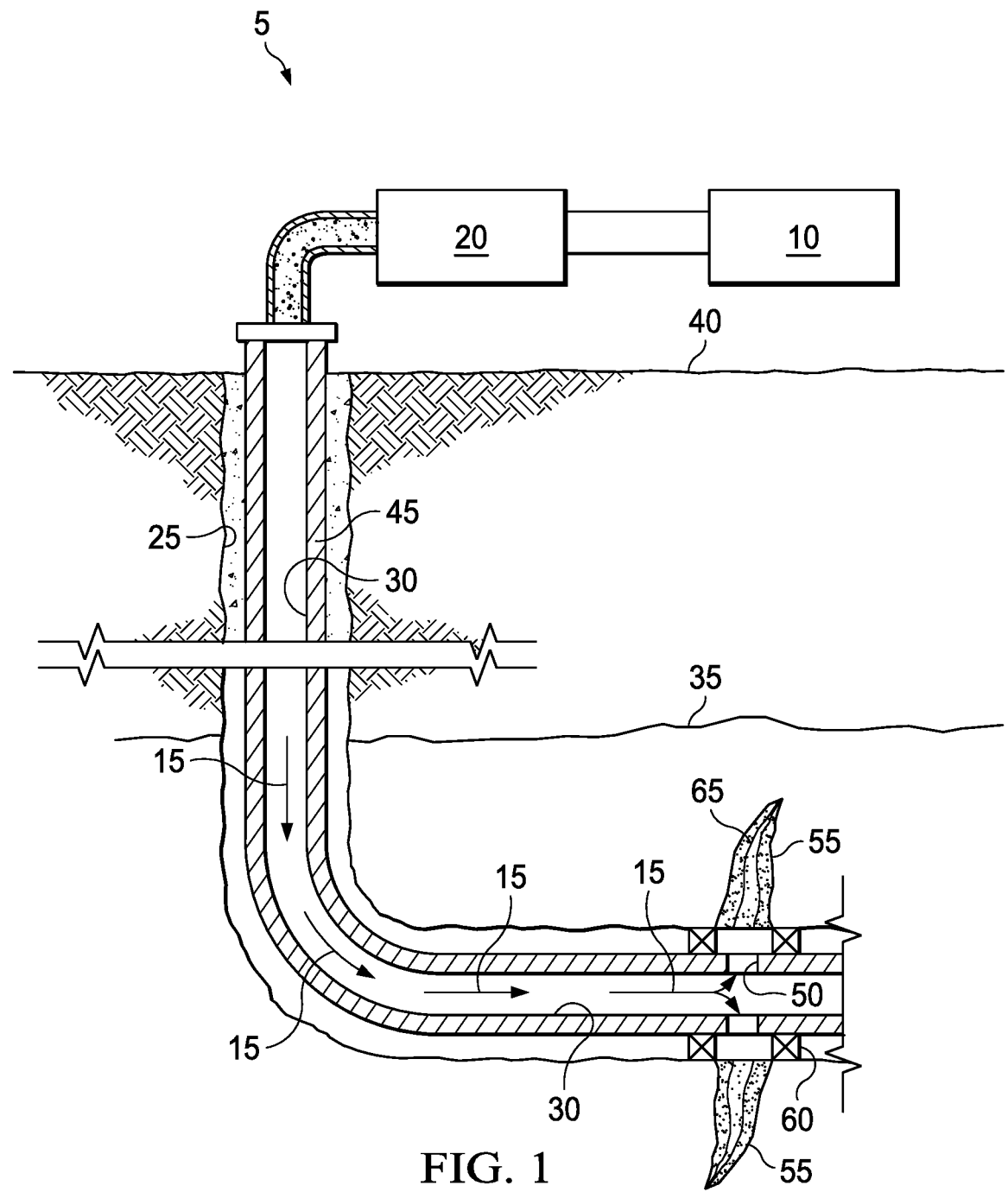
FIG. 1 is a schematic illustrating a fracturing fluid preparation and delivery system in accordance with one or more examples described herein.

The illustrated figures are only exemplary and are not intended to assert or imply any limitation with regard to the environment, architecture, design, or process in which different examples may be implemented.

DETAILED DESCRIPTION

The present disclosure relates generally to fracturing operations, and more particularly, to creating high conductivity layers of high density, high crush strength proppant within a fracture or fracture network while also using larger amounts of lower density, low crush strength proppant to prop the fracture.

In the following detailed description of several illustrative examples, reference is made to the accompanying drawings that form a part hereof, and in which is shown by way of illustration specific examples that may be practiced. These examples are described in sufficient detail to enable those skilled in the art to practice them, and it is to be understood that other examples may be utilized, and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

Unless otherwise indicated, all numbers expressing quantities of ingredients, properties such as molecular weight, particle size, reaction conditions, density, strength, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Unless otherwise specified, any use of any form of the terms "connect," "engage," "couple," "attach," or any other term describing an interaction between elements is not meant to limit the interaction to direct interaction between the elements and may also include indirect interaction between the elements described. Further, any use of any form of the terms "connect," "engage," "couple," "attach," or any other term describing an interaction between elements includes items integrally formed together without the aid of extraneous fasteners or joining devices. In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The terms "uphole" and "downhole" may be used to refer to the location of various components relative to the bottom or end of a well. For example, a first component described as uphole from a second component may be further away from the end of the well than the second component. Similarly, a first component described as being downhole from a second component may be located closer to the end of the well than the second component.

The examples of the methods and systems described herein relate to propping fractures by forming high conductivity layers of high crush strength proppant within a fracture. As used herein, "fracture," unless explicitly referred to otherwise, refers to a primary fracture as well as any other fracture within a fracture network (e.g., secondary fractures, tertiary fractures, etc.). Therefore, the term "fracture" is not to be construed as limiting the disclosure to just the primary fracture. The terms "layer," "vein," "band," etc. when used to describe or illustrate a high conductivity layer of high crush strength proppant refer to an amount of high crush strength proppant occupying a volume or portion of the proppant pack that is layered upon an amount or volume of low crush strength proppant. This high conductivity layer is more resistant to the fracture stresses of the closing fracture than the low crush strength proppant and therefore serves as the path of least resistance for production fluids as the conductivity of the low crush strength proppant is reduced over the life of the well. Advantageously, the methods and systems disclosed herein may inject a small amount of relatively high density; high crush strength proppant (hereafter "HSP") such that it is placed in the near-wellbore region of the primary fracture. As such, there is an increased chance of maintaining a highly conductive pathway connecting the wellbore and the reservoir. As used herein, "HSP" is a high crush strength proppant having a crush strength equal to or exceeding 4000 psi. An additional advantage is that the methods and systems also utilize a large amount of relatively lower density, low crush strength proppant (hereafter "LSP"), and utilize its susceptibility to settling in operations utilizing low viscosity fracturing fluids (e.g., slickwater fluids) in order to provide high conductivity layers of HSP throughout the fracture length. As used herein, "LSP" is a low crush strength proppant having a crush strength less than 4000 psi. The high conductivity layers of HSP may be placed on top of the LSP along the fracture length. The high conductivity layers of HSP are elevated in the fracture as they settle on top of the LSP and thus effectively prop more of the fracture height as opposed to applications utilizing only LSP, which may be further crushed and compacted after settling resulting in less fracture height being propped over time. Moreover, the LSP is generally a much less expensive option than HSP due to its ready availability, and as such, propping a fracture utilizing large amounts of LSP results in an overall cost savings as opposed to propping a fracture exclusively with large amounts of HSP. Additionally, as the LSP is crushed over time, its permeability diminishes. As such, the path of least resistance through which the reservoir fluids may flow increasingly becomes the void space above the settled LSP. However, migrating particulates may screenout this void space over time. The use of high conductivity layers of HSP reduce the possibility of a total blockage as the high conductivity layers of HSP maintain a highly permeable pathway for the reservoir fluid to flow as the HSP.

FIG. 1 is a schematic illustrating a fracturing fluid preparation and delivery system 5. Although FIG. 1 generally depicts a land-based system, it is to be recognized that like systems may be operated in subsea locations as well. An amount of HSP or LSP may be added to an aqueous base fluid along with any fracturing fluid additives and mixed in the mixing equipment 10 to provide the fracturing fluid 15. The mixing equipment 10 may be any mixer sufficient for mixing the components of the fracturing fluid 15 composition. Examples of the mixing equipment 10 may include, but are not limited to, a jet mixer, re-circulating mixer, a batch mixer, and the like. In some examples, the mixing equipment 10 may be a jet mixer and may continuously mix the treatment fluid as it is pumped to the wellbore 25. The HSP or LSP may be added to the mixing equipment 10 first or, alternatively, the aqueous base fluid may be added to the mixing equipment 10 first. The fracturing fluid 15 may be formulated in the mixing equipment 10 such that the components of the fracturing fluid 15, including the HSP, LSP, or the aqueous base fluid, may be added to the mixing equipment 10 in any order and mixed to provide the desired fracturing fluid 15 formulation.

After the fracturing fluid 15 has been mixed in the mixing equipment 10, the fracturing fluid 15 may be pumped to the wellbore 25 via the pumping equipment 20. Mixing equipment 10 may be upstream of the pumping equipment 20. Examples of the pumping equipment 20 include, but are not limited to, floating piston pumps, positive displacement pumps, centrifugal pumps, peristaltic pumps, diaphragm pumps, and the like. The pumping equipment 20 may be configured to raise the pressure of the fracturing fluid 15 to a desired degree before its introduction into the wellbore 25.

In various examples, the pumping equipment 20 (e.g., a low-pressure pump, a high-pressure pump, or a combination thereof) may convey the fracturing fluid 15 from the mixing equipment 10, or other source, to a tubular 30 disposed in the wellbore 25. In other examples, the fracturing fluid 15 may be formulated offsite and transported to the worksite, in which case the fracturing fluid 15 may be introduced to the tubular 30 via the pumping equipment 20 directly from its shipping container (e.g., a truck, a railcar, a barge, or the like) or from a transport pipeline. In either case, the fracturing fluid 15 may be drawn into the pumping equipment 20, elevated to an appropriate pressure, and then introduced into the tubular 30 for delivery downhole.

The pumping equipment 20 may comprise a high-pressure pump in some examples. As used herein, the term "high-pressure pump" will refer to a pump that is capable of delivering a fluid downhole at a pressure of about 1000 psi or greater. The fracturing fluids 15 described herein may be introduced with a high-pressure pump. Suitable high-pressure pumps will be known to one having ordinary skill in the art and may include, but are not limited to, floating piston pumps and positive displacement pumps.

In other examples, the pumping equipment 20 may comprise a low-pressure pump. As used herein, the term "low-pressure pump" will refer to a pump that operates at a pressure of less than about 1000 psi. In some examples, a low-pressure pump may be fluidly coupled to a high-pressure pump that is fluidly coupled to the tubular 30. That is, the low-pressure pump may be configured to convey the fracturing fluid 15 to the high-pressure pump. In such examples, the low-pressure pump may "step up" the pressure of a fracturing fluid 15 before it reaches the high-pressure pump.

FIG. 1 further illustrates the downhole portion of the fracturing fluid preparation and delivery system 5. As illustrated, wellbore 25 penetrates a portion of a subterranean formation 35. The wellbore 25 may extend from the surface 40. Although shown as vertical deviating to horizontal, the wellbore 25 may include horizontal, vertical, slant, curved, and other types of wellbore geometries and orientations, and the fracturing fluids 15 may be applied to any subterranean zone surrounding any portion of the wellbore 25. The wellbore 25 may include a casing 45 that is cemented, uncemented, or otherwise secured to the wall of the wellbore 25. In some examples, the wellbore 25 may be uncased or include uncased sections. Perforations may be formed in the tubular 30 and/or the casing 45 to allow fracturing fluids 15 and/or other materials to flow into the subterranean formation 35. The perforations may be formed using shape charges, a perforating gun, hydro-jetting, and/or other tools.

The wellbore 25 is shown with the tubular 30 descending from the surface 40. The mixing equipment 10 and the pumping equipment 20 may be directly or indirectly coupled to the tubular 30 to pump the fracturing fluids 15 into the wellbore 25 as was discussed above. The tubular 30 may include coiled tubing, jointed pipe, and/or other structures that allow fluid to flow into the wellbore 25. The tubular 30 may include flow control devices, bypass valves, ports, and/or other tools or well devices capable of controlling the flow of a fluid from the interior of the tubular 30 into the subterranean formation 35. For example, the tubular 30 may include ports 50 that are spaced apart from the wall of the wellbore 25 to communicate a fracturing fluid 15 into an annulus in the wellbore 25 adjacent to a fracture 55 and between the tubular 30 and the wall of the wellbore 25. Alternatively, the tubular 30 may include ports 50 directly adjacent to the fracture 55 in the wall of the wellbore 25 to communicate a fracturing fluid 15 directly into the fracture 55.

With continued reference to FIG. 1, the tubular 30 and/or the wellbore 25 may include one or more sets of packers 60 that seal the annulus between the tubular 30 and the wellbore 25 to define an interval of the wellbore 25 into which the fracturing fluid 15 may be introduced. FIG. 1 illustrates two packers 60, one defining an uphole boundary of the interval and one defining the downhole boundary of the interval.

The fracturing fluids 15 may be introduced into the wellbore 25 at a sufficient pressure to create, enhance, and/or enter a fracture 55. In some optional examples, a solids-free fluid, referred to as a pad fluid, may be used as a fracturing fluid 15 to create a fracture of sufficient size to introduce particulates such as the HSP and LSP in subsequent fracturing fluids 15. In some optional examples, a fracturing fluid 15 containing a micro-proppant (e.g., proppant having a D50 particle size less than 100 µm) may be injected following the injection of a pad fluid to place the micro-proppant in the induced secondary or tertiary fractures propagated from the primary fracture. This may be done prior to the injection of any fracturing fluids 15 comprising HSP or LSP. In some further optional examples, the fracturing fluid 15 containing a micro-proppant may be injected to create a primary fracture and simultaneously a plurality of secondary and tertiary fractures. Subsequently, placement of micro-proppant into these secondary and tertiary fractures may be done prior to the injection of any fracturing fluids 15 containing HSP or LSP. In some examples, a pad fluid may not be used, and the fracturing fluid 15 may comprise a particulate such as HSP. The HSP and the LSP may be used to prop the fracture 55 by forming a proppant pack 65 within the fracture 55. In the illustrated example of FIG. 1, a propping operation has been performed to produce a proppant pack 65 with layers of HSP and LSP within the fracture 55. This operation is discussed in greater detail below. The layers of HSP and LSP comprise different crush strengths, and the HSP layer(s) possess higher permeability and conductivity to reservoir fluids. Completion of the fracturing operation may comprise allowing the liquid portion of the fracturing fluid 15 to flow out of the fracture 55. The formed proppant pack 65 may remain in the fracture 55. Reservoir fluids such as hydrocarbons may freely flow out of the propped fracture 55 via any flow paths or channels through the proppant pack 65 when the liquid portions of the fracturing fluids 15 are flowed out of the fracture 55.

The methods and systems of the present disclosure may be used during or in conjunction with any subterranean fracturing operation. For example, the fracturing fluid 15 may be introduced into the subterranean formation 35 at or above a pressure sufficient to create or enhance one or more fractures 55 in at least a portion of the subterranean formation 35. Such fractures 55 may be "enhanced" where a pre-existing fracture 55 (e.g., naturally occurring or otherwise previously formed) is enlarged or lengthened by the fracturing operation.

The fracturing fluids 15 used in the methods and systems of the present disclosure may be prepared using any suitable method and/or equipment (e.g., blenders, stirrers, etc.). In some examples, the fracturing fluids 15 may be prepared at a well site or at an off-site location. Once prepared, a fracturing fluid 15 of the present disclosure may be placed in a tank, bin, or other container for storage and/or transport to the site where it is to be used. In other examples, a fracturing fluid 15 may be prepared on-site, including using continuous mixing or any "on-the-fly" methods.

It is to be recognized that the fracturing fluid preparation and delivery system 5 is merely exemplary in nature, and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

It should be clearly understood that the example fracturing fluid preparation and delivery system 5 illustrated by FIG. 1 is merely a general application of the principles of this disclosure in practice, and a wide variety of other examples are possible. Therefore, the scope of this disclosure is not limited in any manner to the details of FIG. 1 as described herein.

Figure 2:
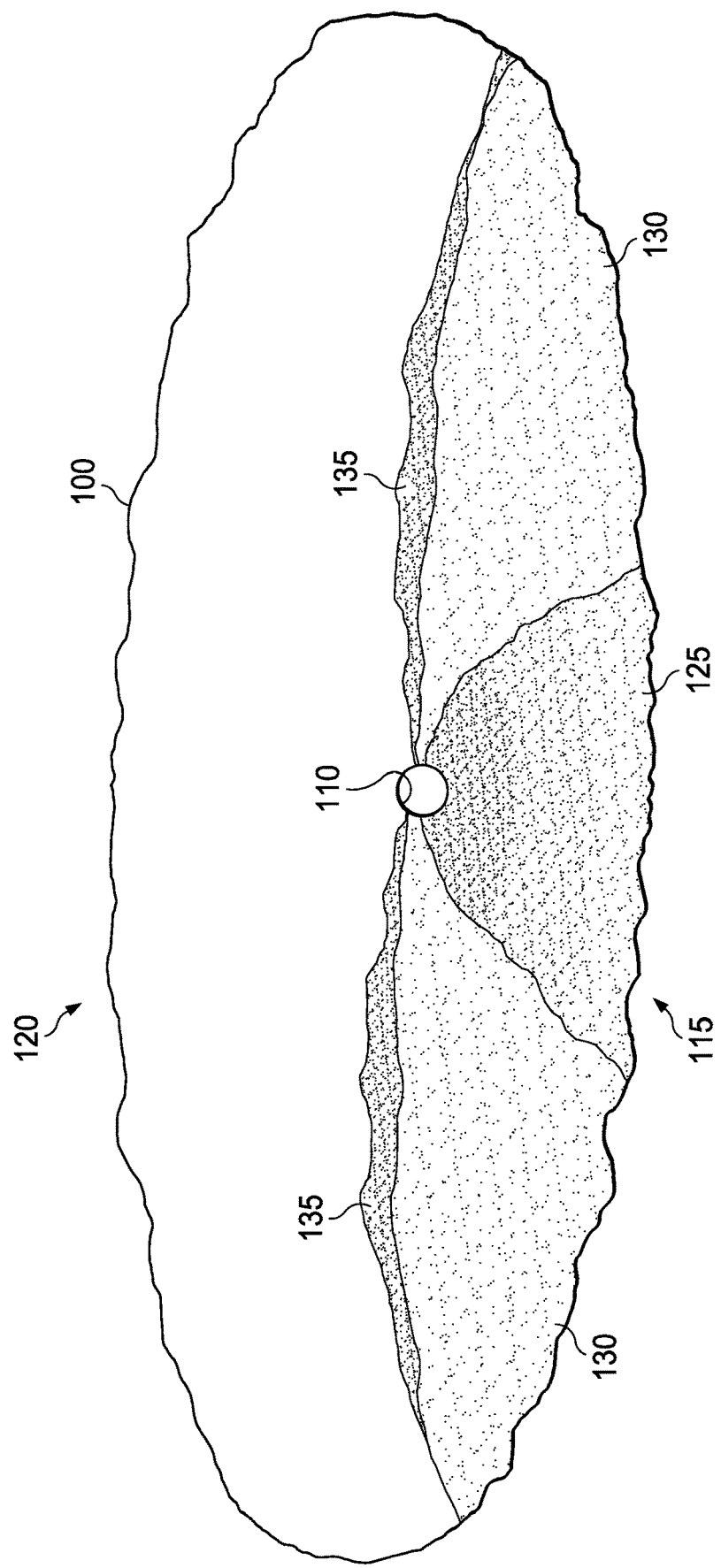
FIG. 2 is a cross-sectional side view illustration of an example packing profile of a fracture in accordance with one or more examples described herein.

FIG. 2 is a cross-sectional side view illustration of an example packing profile of a fracture. The perspective of FIG. 2 is from the near wellbore region of the primary fracture looking towards the wellbore. The orientation is generally that of how the primary fracture appears in a horizontal wellbore, although vertical, slant, curved, and any other type of wellbore geometry and orientation are expressly contemplated for use with the methods and systems disclosed herein.

With continued reference to FIG. 2, a fracture 100 has been formed in a subterranean formation penetrated by a wellbore 110. The fracture comprises a lower portion, generally 115, and an upper portion, generally 120. In some examples, the fracture 100 may be formed or enhanced by a pad fluid prior to the introduction of the proppant into the fracture 100. The pad fluid may be injected at a rate exceeding the fracture gradient of the fracture 100. A first amount of HSP 125 may be injected into the fracture 100 (e.g., directly after the pad fluid), while pressure is still applied. The first amount of HSP 125 may be carried into the fracture 100 by a first fracturing fluid (e.g., a fracturing fluid 15 as illustrated in FIG. 1). The first fracturing fluid may comprise the first amount of HSP 125 and an aqueous base fluid. This first amount of HSP 125 may settle or be allowed to settle in the near wellbore region as illustrated. The HSP 125 placed in the near wellbore region may prevent pinching or closing of the primary fracture portion of the fracture 100 at the near wellbore region. The first amount of HSP 125 is a relatively small amount, as discussed in more detail below, and may comprise a concentration in a range of about 0.1 pounds per gallon (hereafter "ppg") to about 6 ppg, preferably in a range of about 0.25 ppg to about 3 ppg of the first fracturing fluid. The first amount of HSP 125 may create a high conductivity, high crush resistance region in the near wellbore portion of the fracture 100. This high conductivity, high crush resistance region may reduce the risk of losing permeability into the wellbore at the fracture face.

Subsequent to the first fracturing fluid, a second fracturing fluid may be introduced into the fracture 100. The second fracturing fluid comprises a first amount of LSP 130 and an aqueous base fluid. The first amount of LSP 130 settles or is allowed to settle generally on top of a portion of the settled first amount of HSP 125. The first amount of LSP 130 is a relatively large amount, as discussed in more detail below, and may comprise a concentration in a range of about 0.1 ppg to about 6 ppg, preferably in a range of about 0.25 ppg to about 3 ppg of the second fracturing fluid. The first amount of LSP 130 may create a sand bank or dune leading a significant distance into the fracture 100 and away from the wellbore 110. This first amount of LSP 130 forms a conductive path, but as it lacks the high crush strength of the HSP, its conductivity may be reduced over the life of the well.

A third fracturing fluid is then introduced comprising a second amount of HSP 135 and an aqueous base fluid. The second amount of HSP 135 settles or is allowed to settle generally on top of a portion of the first amount of LSP 130. As such, the second amount of HSP 135 forms a high conductivity layer of HSP running the length of a portion of the fracture. This high conductivity layer is also closer to the upper portion 120 of the fracture 100 than the first amount of LSP 130. The high conductivity layer of HSP is also more resistant to the closure stresses of the fracture 100 and may better maintain its permeability relative to the settled first amount of LSP 130. The second amount of HSP 135 creates the high conductivity layer on top of the first amount of LSP 130. This high conductivity layer (which may also be described as a vein or band) runs deep into the length of the fracture 100 formed in the reservoir to maintain and maximize the effective fracture length over time.

After placing the second amount of HSP 135, flow may be removed allowing the aqueous base fluid to flow out of the fracture 100. Reservoir fluids may then flow through the formed proppant pack and into the wellbore 110. The second amount of HSP 135 is a relatively larger amount as compared to the first amount of HSP 125. The second amount of HSP 135 may comprise a concentration in a range of about 0.1 ppg to about 6 ppg, preferably in a range of about 0.25 ppg to about 3 ppg of the third fracturing fluid.

With continued reference to FIG. 2, the first amount of HSP 125 in the first fracturing fluid is present in a range of about 1% to about 15%, preferably in a range of about 5% to 10%, by weight of the total weight of proppants placed in the fracture 100. The first amount of LSP 130 in the second fracturing fluid is present in a range of about 50% to about 90%, preferably in a range of about 70% to 85%, by weight of the total weight of proppants placed in the fracture 100. The second amount of HSP 135 in the third fracturing fluid is present in a range of about 5% to about 35%, preferably in a range of about 10% to 25%, by weight of the total weight of proppants placed in the fracture.

The first fracturing fluid, second fracturing fluid, and third fracturing fluid are introduced without pulsing. Stated another way, the first amount of HSP 125, the first amount of LSP 130, and the second amount of HSP 135 are introduced sequentially into the wellbore without any solids-free fluids introduced in-between. As such, the first amount of HSP 125, the first amount of LSP 130, and the second amount of HSP 135 are allowed to settle on top of one another and form a proppant pack extending from the lower portion 115 of the fracture 100 towards the upper portion 120 of the fracture 100 and also extending at least a portion of the length of the fracture 100. The vertical range of the fracture 100 that is ultimately propped is determined by the fracture geometry and the total amount of all proppant introduced amongst other factors.

The concentration of the first amount of HSP 125 in the first fracturing fluid may range from about 0.1 ppg to about 6 ppg. The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the first amount of HSP 125 in the first fracturing fluid may range from about 0.1 ppg to about 6 ppg, from about 0.15 ppg to about 6 ppg, from about 0.2 ppg to about 6 ppg, from about 0.25 ppg to about 6 ppg, from about 0.3 ppg to about 6 ppg, from about 0.35 ppg to about 6 ppg, from about 0.4 ppg to about 6 ppg, from about 0.45 ppg to about 6 ppg, from about 0.5 ppg to about 6 ppg, from about 0.6 ppg to about 6 ppg, from about 0.7 ppg to about 6 ppg, from about 0.8 ppg to about 6 ppg, from about 0.9 ppg to about 6 ppg, from about 1 ppg to about 6 ppg, from about 1.5 ppg to about 6 ppg, from about 2 ppg to about 6 ppg, from about 2.5 ppg to about 6 ppg, from about 3 ppg to about 6 ppg from about 3.5 ppg to about 6 ppg, from about 4 ppg to about 6 ppg, from about 4.5 ppg to about 6 ppg, from about 5 ppg to about 6 ppg, or from about 5.5 ppg to about 6 ppg. As another example, the concentration of the first amount of HSP 125 in the first fracturing fluid may range from about 0.1 ppg to about 6 ppg, from about 0.1 ppg to about 5.5 ppg, from about 0.1 ppg to about 5 ppg, from about 0.1 ppg to about 4.5 ppg, from about 0.1 ppg to about 4 ppg, from about 0.1 ppg to about 3.5 ppg, from about 0.1 ppg to about 3 ppg, from about 0.1 ppg to about 2.5 ppg, from about 0.1 ppg to about 2 ppg, from about 0.1 ppg to about 1.5 ppg, from about 0.1 ppg to about 1 ppg, from about 0.1 ppg to about 0.9 ppg, from about 0.1 ppg to about 0.8 ppg, from about 0.1 ppg to about 0.7 ppg, from about 0.1 ppg to about 0.6 ppg, from about 0.1 ppg to about 0.5 ppg, from about 0.1 ppg to about 0.45 ppg, from about 0.1 ppg to about 0.4 ppg from about 0.1 ppg to about 0.35 ppg, from about 0.1 ppg to about 0.3 ppg, from about 0.1 ppg to about 0.25 ppg, from about 0.1 ppg to about 0.2 ppg, or from about 0.1 ppg to about 0.15 ppg. With the benefit of this disclosure, one of ordinary skill in the art will be readily able to prepare a first fracturing fluid having a sufficient concentration of HSP for a given application.

The concentration of the first amount of LSP 130 in the second fracturing fluid may range from about 0.1 ppg to about 6 ppg. The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the first amount of LSP 130 in the second fracturing fluid may range from about 0.1 ppg to about 6 ppg, from about 0.15 ppg to about 6 ppg, from about 0.2 ppg to about 6 ppg, from about 0.25 ppg to about 6 ppg, from about 0.3 ppg to about 6 ppg, from about 0.35 ppg to about 6 ppg, from about 0.4 ppg to about 6 ppg, from about 0.45 ppg to about 6 ppg, from about 0.5 ppg to about 6 ppg, from about 0.6 ppg to about 6 ppg, from about 0.7 ppg to about 6 ppg, from about 0.8 ppg to about 6 ppg, from about 0.9 ppg to about 6 ppg, from about 1 ppg to about 6 ppg, from about 1.5 ppg to about 6 ppg, from about 2 ppg to about 6 ppg, from about 2.5 ppg to about 6 ppg, from about 3 ppg to about 6 ppg from about 3.5 ppg to about 6 ppg, from about 4 ppg to about 6 ppg, from about 4.5 ppg to about 6 ppg, from about 5 ppg to about 6 ppg, or from about 5.5 ppg to about 6 ppg. As another example, the concentration of the first amount of LSP 130 in the second fracturing fluid may range from about 0.1 ppg to about 6 ppg, from about 0.1 ppg to about 5.5 ppg, from about 0.1 ppg to about 5 ppg, from about 0.1 ppg to about 4.5 ppg, from about 0.1 ppg to about 4 ppg, from about 0.1 ppg to about 3.5 ppg, from about 0.1 ppg to about 3 ppg, from about 0.1 ppg to about 2.5 ppg, from about 0.1 ppg to about 2 ppg, from about 0.1 ppg to about 1.5 ppg, from about 0.1 ppg to about 1 ppg, from about 0.1 ppg to about 0.9 ppg, from about 0.1 ppg to about 0.8 ppg, from about 0.1 ppg to about 0.7 ppg, from about 0.1 ppg to about 0.6 ppg, from about 0.1 ppg to about 0.5 ppg, from about 0.1 ppg to about 0.45 ppg, from about 0.1 ppg to about 0.4 ppg from about 0.1 ppg to about 0.35 ppg, from about 0.1 ppg to about 0.3 ppg, from about 0.1 ppg to about 0.25 ppg, from about 0.1 ppg to about 0.2 ppg, or from about 0.1 ppg to about 0.15 ppg. With the benefit of this disclosure, one of ordinary skill in the art will be readily able to prepare a second fracturing fluid having a sufficient concentration of LSP for a given application.

The concentration of the second amount of HSP 135 in the third fracturing fluid may range from about 0.1 ppg to about 6 ppg. The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the second amount of HSP 135 in the third fracturing fluid may range from about 0.1 ppg to about 6 ppg, from about 0.15 ppg to about 6 ppg, from about 0.2 ppg to about 6 ppg, from about 0.25 ppg to about 6 ppg, from about 0.3 ppg to about 6 ppg, from about 0.35 ppg to about 6 ppg, from about 0.4 ppg to about 6 ppg, from about 0.45 ppg to about 6 ppg, from about 0.5 ppg to about 6 ppg, from about 0.6 ppg to about 6 ppg, from about 0.7 ppg to about 6 ppg, from about 0.8 ppg to about 6 ppg, from about 0.9 ppg to about 6 ppg, from about 1 ppg to about 6 ppg, from about 1.5 ppg to about 6 ppg, from about 2 ppg to about 6 ppg, from about 2.5 ppg to about 6 ppg, from about 3 ppg to about 6 ppg from about 3.5 ppg to about 6 ppg, from about 4 ppg to about 6 ppg, from about 4.5 ppg to about 6 ppg, from about 5 ppg to about 6 ppg, or from about 5.5 ppg to about 6 ppg. As another example, the concentration of the second amount of HSP 135 in the third fracturing fluid may range from about 0.1 ppg to about 6 ppg, from about 0.1 ppg to about 5.5 ppg, from about 0.1 ppg to about 5 ppg, from about 0.1 ppg to about 4.5 ppg, from about 0.1 ppg to about 4 ppg, from about 0.1 ppg to about 3.5 ppg, from about 0.1 ppg to about 3 ppg, from about 0.1 ppg to about 2.5 ppg, from about 0.1 ppg to about 2 ppg, from about 0.1 ppg to about 1.5 ppg, from about 0.1 ppg to about 1 ppg, from about 0.1 ppg to about 0.9 ppg, from about 0.1 ppg to about 0.8 ppg, from about 0.1 ppg to about 0.7 ppg, from about 0.1 ppg to about 0.6 ppg, from about 0.1 ppg to about 0.5 ppg, from about 0.1 ppg to about 0.45 ppg, from about 0.1 ppg to about 0.4 ppg from about 0.1 ppg to about 0.35 ppg, from about 0.1 ppg to about 0.3 ppg, from about 0.1 ppg to about 0.25 ppg, from about 0.1 ppg to about 0.2 ppg, or from about 0.1 ppg to about 0.15 ppg. With the benefit of this disclosure, one of ordinary skill in the art will be readily able to prepare a third fracturing fluid having a sufficient concentration of HSP for a given application.

Figure 3:
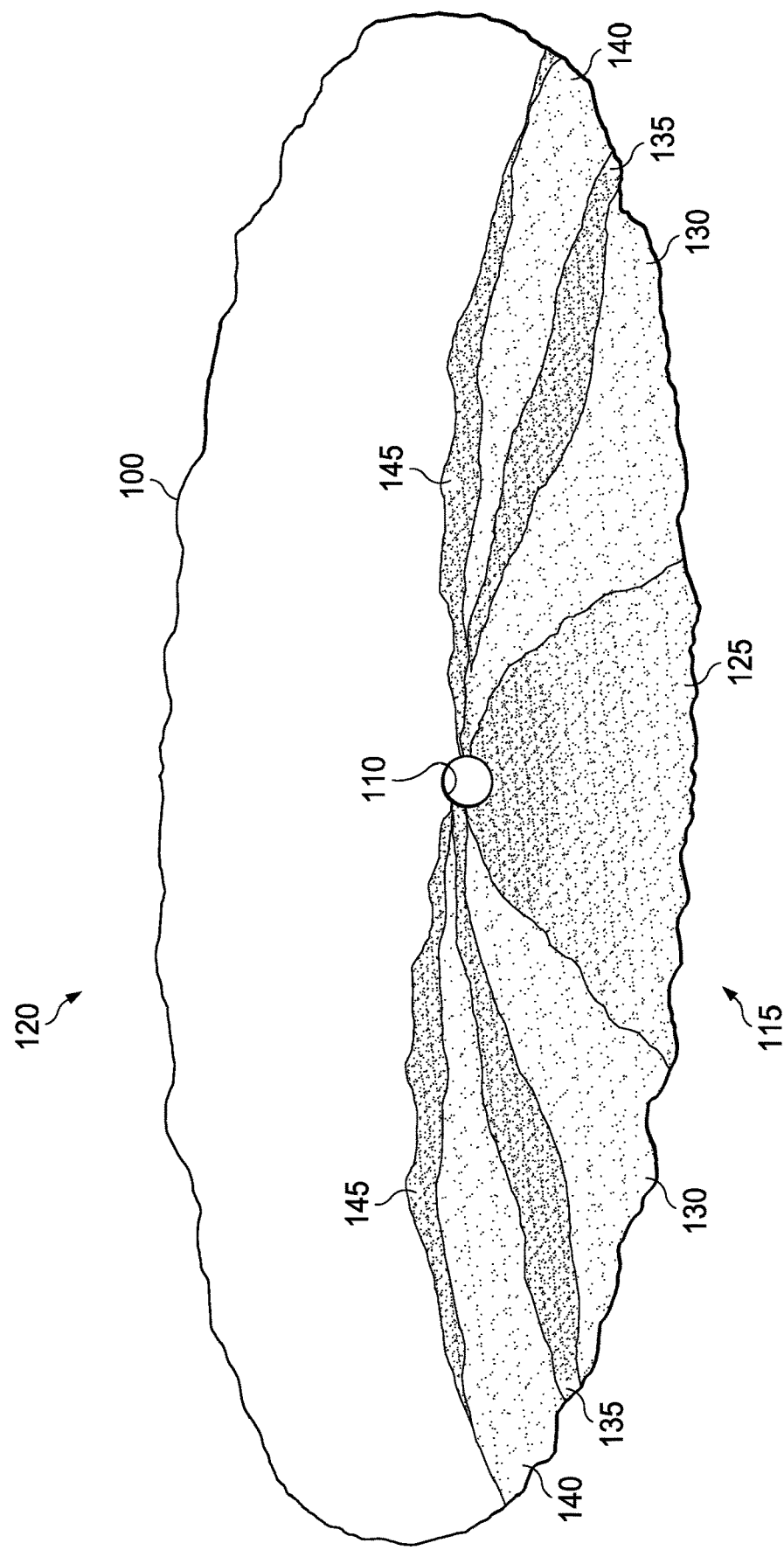
FIG. 3 is a cross-sectional side view illustration of another example packing profile of a fracture in accordance with one or more examples described herein.

FIG. 3 is a cross-sectional side view illustration of another example packing profile of a fracture. The perspective of FIG. 3 is from the near wellbore region of the primary fracture looking towards the wellbore. The orientation is generally that of how the primary fracture appears in a horizontal wellbore, although vertical, slant, curved, and any other type of wellbore geometry and orientation are expressly contemplated for use with the methods and systems disclosed herein.

FIG. 3 is a variation of the example illustrated by FIG. 2. In the illustration of FIG. 3, a first fracturing fluid, a second fracturing fluid, and a third fracturing fluid have been used to place the first amount of HSP 125, the first amount of LSP 130, and the second amount of HSP 135 respectively as was discussed in the example of FIG. 2. However, in the illustration of FIG. 3, additional amounts of HSP and LSP are alternatingly introduced. For example, after the introduction of the third fracturing fluid, the second amount of HSP 135 is placed and allowed to settle on the previously placed first amount of LSP 130. Instead of removing flow and allowing the aqueous base fluid to flow out of the fracture 100, a fourth fracturing fluid comprising a second amount of LSP 140 and an aqueous base fluid is introduced. The second amount of LSP 140 then settles or is allowed to settle on the second amount of HSP 135. A fifth fracturing fluid is then introduced. The fifth fracturing fluid comprises a third amount of HSP 145 and an aqueous base fluid. The third amount of HSP 145 then settles or is allowed to settle on top of the second amount of LSP 140. The third amount of HSP 145 forms a second high conductivity layer in the fracture 100. This process of alternating amounts of HSP and LSP may be repeated as desired to add any number of high conductivity layers of HSP in the fracture 100.

With continued reference to FIG. 3, the first amount of HSP 125 in the first fracturing fluid is in a range of about 1% to about 15%, preferably in a range of about 5% to 10%, by weight of the total weight of proppants placed in the fracture 100. The first amount of LSP 130 in the second fracturing fluid is in a range of about 20% to about 60%, preferably in a range of about 30% to 40%, by weight of the total weight of proppants placed in the fracture 100. The second amount of HSP 135 in the third fracturing fluid is in a range of about 5% to about 25%, preferably in a range of about 10% to 20%, by weight of the total weight of proppants placed in the fracture. The second amount of LSP 140 in the fourth fracturing fluid is in a range of about 20% to about 60%, preferably in a range of about 30% to 40%, by weight of the total weight of proppants placed in the fracture. The third amount of HSP 145 in the fifth fracturing fluid is in a range of about 5% to about 25%, preferably in a range of about 10% to 20%, by weight of the total weight of proppants placed in the fracture. These amounts may be further adjusted in the manner illustrated should additional fracturing fluids and high conductivity layers be desired.

The first fracturing fluid, second fracturing fluid, third fracturing fluid, fourth fracturing fluid, fifth fracturing fluid, and so on are introduced without pulsing. Stated another way, the first amount of HSP 125, the first amount of LSP 130, the second amount of HSP 135, the second amount of LSP 140, the third amount of HSP 145, and so on are introduced sequentially into the wellbore 110 without any solids-free fluids introduced in-between. As such, the alternating amounts of HSP and LSP are allowed to settle on top of one another and form a proppant pack extending from the lower portion 115 of the fracture 100 towards the upper portion 120 of the fracture 100 as well as at least a portion of the fracture 100 length. The vertical range of the fracture 100 that is ultimately propped is determined by the fracture geometry and the total amount of all proppant introduced amongst other factors.

The concentrations of the first amount of HSP 125 in the first fracturing fluid, the first amount of LSP 130 in the second fracturing fluid, and the second amount of HSP 135 in the third fracturing fluid are the same as was discussed above regarding the example illustrated by FIG. 2.

The concentration of the second amount of LSP 140 in the fourth fracturing fluid may range from about 0.1 ppg to about 6 ppg. The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the second amount of LSP 140 in the fourth fracturing fluid may range from about 0.1 ppg to about 6 ppg, from about 0.15 ppg to about 6 ppg, from about 0.2 ppg to about 6 ppg, from about 0.25 ppg to about 6 ppg, from about 0.3 ppg to about 6 ppg, from about 0.35 ppg to about 6 ppg, from about 0.4 ppg to about 6 ppg, from about 0.45 ppg to about 6 ppg, from about 0.5 ppg to about 6 ppg, from about 0.6 ppg to about 6 ppg, from about 0.7 ppg to about 6 ppg, from about 0.8 ppg to about 6 ppg, from about 0.9 ppg to about 6 ppg, from about 1 ppg to about 6 ppg, from about 1.5 ppg to about 6 ppg, from about 2 ppg to about 6 ppg, from about 2.5 ppg to about 6 ppg, from about 3 ppg to about 6 ppg from about 3.5 ppg to about 6 ppg, from about 4 ppg to about 6 ppg, from about 4.5 ppg to about 6 ppg, from about 5 ppg to about 6 ppg, or from about 5.5 ppg to about 6 ppg. As another example, the concentration of the second amount of LSP 140 in the fourth fracturing fluid may range from about 0.1 ppg to about 6 ppg, from about 0.1 ppg to about 5.5 ppg, from about 0.1 ppg to about 5 ppg, from about 0.1 ppg to about 4.5 ppg, from about 0.1 ppg to about 4 ppg, from about 0.1 ppg to about 3.5 ppg, from about 0.1 ppg to about 3 ppg, from about 0.1 ppg to about 2.5 ppg, from about 0.1 ppg to about 2 ppg, from about 0.1 ppg to about 1.5 ppg, from about 0.1 ppg to about 1 ppg, from about 0.1 ppg to about 0.9 ppg, from about 0.1 ppg to about 0.8 ppg, from about 0.1 ppg to about 0.7 ppg, from about 0.1 ppg to about 0.6 ppg, from about 0.1 ppg to about 0.5 ppg, from about 0.1 ppg to about 0.45 ppg from about 0.1 ppg to about 0.4 ppg from about 0.1 ppg to about 0.35 ppg, from about 0.1 ppg to about 0.3 ppg, from about 0.1 ppg to about 0.25 ppg, from about 0.1 ppg to about 0.2 ppg, or from about 0.1 ppg to about 0.15 ppg. With the benefit of this disclosure, one of ordinary skill in the art will be readily able to prepare a fourth fracturing fluid having a sufficient concentration of LSP for a given application.

The concentration of the third amount of HSP 145 in the fifth fracturing fluid may range from about 0.1 ppg to about 6 ppg. The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the third amount of HSP 145 in the fifth fracturing fluid may range from about 0.1 ppg to about 6 ppg, from about 0.15 ppg to about 6 ppg, from about 0.2 ppg to about 6 ppg, from about 0.25 ppg to about 6 ppg, from about 0.3 ppg to about 6 ppg, from about 0.35 ppg to about 6 ppg, from about 0.4 ppg to about 6 ppg, from about 0.45 ppg to about 6 ppg, from about 0.5 ppg to about 6 ppg, from about 0.6 ppg to about 6 ppg, from about 0.7 ppg to about 6 ppg, from about 0.8 ppg to about 6 ppg, from about 0.9 ppg to about 6 ppg, from about 1 ppg to about 6 ppg, from about 1.5 ppg to about 6 ppg, from about 2 ppg to about 6 ppg, from about 2.5 ppg to about 6 ppg, from about 3 ppg to about 6 ppg from about 3.5 ppg to about 6 ppg, from about 4 ppg to about 6 ppg, from about 4.5 ppg to about 6 ppg, from about 5 ppg to about 6 ppg, or from about 5.5 ppg to about 6 ppg. As another example, the concentration of the third amount of HSP 145 in the fifth fracturing fluid may range from about 0.1 ppg to about 6 ppg, from about 0.1 ppg to about 5.5 ppg, from about 0.1 ppg to about 5 ppg, from about 0.1 ppg to about 4.5 ppg, from about 0.1 ppg to about 4 ppg, from about 0.1 ppg to about 3.5 ppg, from about 0.1 ppg to about 3 ppg, from about 0.1 ppg to about 2.5 ppg, from about 0.1 ppg to about 2 ppg, from about 0.1 ppg to about 1.5 ppg, from about 0.1 ppg to about 1 ppg, from about 0.1 ppg to about 0.9 ppg, from about 0.1 ppg to about 0.8 ppg, from about 0.1 ppg to about 0.7 ppg, from about 0.1 ppg to about 0.6 ppg, from about 0.1 ppg to about 0.5 ppg, from about 0.1 ppg to about 0.45 ppg, from about 0.1 ppg to about 0.4 ppg from about 0.1 ppg to about 0.35 ppg, from about 0.1 ppg to about 0.3 ppg, from about 0.1 ppg to about 0.25 ppg, from about 0.1 ppg to about 0.2 ppg, or from about 0.1 ppg to about 0.15 ppg. With the benefit of this disclosure, one of ordinary skill in the art will be readily able to prepare a fifth fracturing fluid having a sufficient concentration of HSP for a given application.

Figure 4:
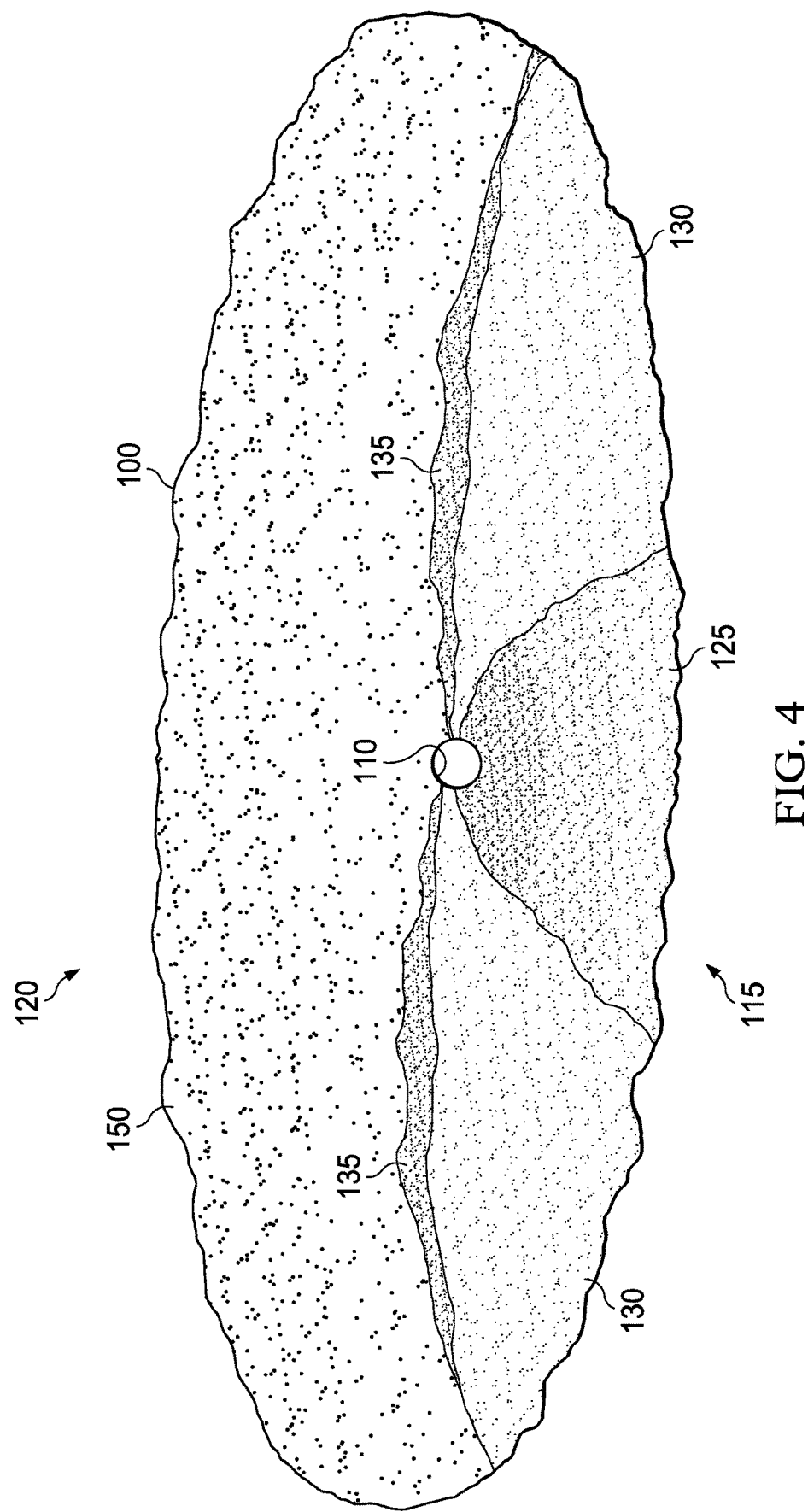
FIG. 4 is a cross-sectional side view illustration of yet another example packing profile of a fracture in accordance with one or more examples described herein.

FIG. 4 is a cross-sectional side view illustration of yet another packing profile of a fracture. The perspective of FIG. 4 is from the near wellbore region of the primary fracture looking towards the wellbore. The orientation is generally that of how the primary fracture appears in a horizontal wellbore, although vertical, slant, curved, and any other type of wellbore geometry and orientation are expressly contemplated for use with the methods and systems disclosed herein.

FIG. 4 is a variation of the example illustrated by FIG. 2. In the illustration of FIG. 4, a first fracturing fluid, a second fracturing fluid, and a third fracturing fluid have been used to place the first amount of HSP 125, the first amount of LSP 130, and the second amount of HSP 135, respectively, just as was discussed in the example of FIG. 2. However, in the illustration of FIG. 4, a buoyant, neutrally buoyant, or near neutrally buoyant proppant (hereafter "BP") is also delivered into the fracture 100 via the second fracturing fluid, the third fracturing fluid, or a fourth fracturing fluid. For example, after the introduction of the first fracturing fluid, the first amount of LSP 130 is mixed with a first amount of BP 150, and both are placed in the fracture 100. The first amount of LSP 130 is allowed to settle on at least a portion of the previously placed first amount of HSP 125 while the first amount of BP 150 remains in the fluid and may prop the upper portion 120 of the fracture 100. The third fracturing fluid is then introduced comprising a second amount of HSP 135. In some optional examples, the third fracturing fluid may comprise the first amount of BP 150 or a second amount of BP (not illustrated), if a first amount of BP 150 was introduced with the second fracturing fluid. In other alternative examples, a fourth fracturing fluid (called a buoyant proppant fracturing fluid) may be introduced which may comprise the first amount of BP 150 instead. This buoyant proppant fracturing fluid may be introduced after the second fracturing fluid and/or the third fracturing fluid. This buoyant proppant fracturing fluid does not comprise the HSP or LSP, which is to say it does not comprise proppant having a specific gravity greater than 2.2 as discussed in greater detail below. The second amount of HSP 135 settles or is allowed to settle generally on top of a portion of the first amount of LSP 130. As such, the second amount of HSP 135 forms a high conductivity layer of HSP. This high conductivity layer of HSP is more resistant to the closure stresses of the fracture 100 and may better maintain its permeability relative to the settled first amount of LSP 130. After placing the second amount of HSP 135, flow may be removed allowing the aqueous base fluid to flow out of the fracture 100. Reservoir fluids may then flow through the proppant pack and into the wellbore 110. The first amount of BP 150 remaining in the aqueous base fluid in the upper portion 120 of the fracture 100 may prop the upper portion 120 of the fracture 100, as the aqueous base fluid is flowed out of the fracture 100. As such, the first amount of BP 150 may prevent closure of the upper portion 120 of the fracture 100, allowing flow of reservoir fluid therethrough.

The first fracturing fluid, second fracturing fluid, and third fracturing fluid are introduced without pulsing. Stated another way, the first amount of HSP 125, the first amount of LSP 130, and the second amount of HSP 135 are introduced sequentially into the wellbore 110 without any solids-free fluids introduced in-between. As such, the first amount of HSP 125, the first amount of LSP 130, and the second amount of HSP 135 are allowed to settle on top of one another and form a proppant pack extending from the lower portion 115 of the fracture 100 towards the upper portion 120 of the fracture 100. The vertical range of the fracture 100 that is ultimately propped is determined by the fracture geometry, the total amount of all proppant introduced, and the degree of propping performed by the first amount of BP 150 amongst other factors.

The concentration of the first amount of HSP 125 in the first fracturing fluid, the concentration of the first amount of LSP 130 in the second fracturing fluid, and the concentration of the second amount of HSP 135 in the third fracturing fluid are the same as was discussed above with regards to the example illustrated by FIG. 2.

The concentration of the first amount of BP 150 in a fracturing fluid may range from about 0.01 ppg to about 1 ppg, preferably in a range from about 0.05 ppg to about 0.5 ppg. The concentration of the first amount of BP 150 (or any subsequent amount of BP) may be greater in a fracturing fluid in which the BP 150 is the sole species of proppant (e.g., a fracturing fluid lacking HSP or LSP) than in a fracturing fluid in which the first amount of BP 150 is also present with the first amount of LSP 130 or the second amount of HSP 135 (e.g., if the first amount of BP 150 is present in the second or third fracturing fluids). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the first amount of BP 150 in a fracturing fluid may range from about 0.01 ppg to about 1 ppg, from about 0.05 ppg to about 1 ppg, from about 0.1 ppg to about 1 ppg, from about 0.15 ppg to about 1 ppg, from about 0.2 ppg to about 1 ppg, from about 0.25 ppg to about 1 ppg, from about 0.3 ppg to about 1 ppg, from about 0.35 ppg to about 1 ppg, from about 0.4 ppg to about 1 ppg, from about 0.45 ppg to about 1 ppg, from about 0.5 ppg to about 1 ppg, from about 0.6 ppg to about 1 ppg, from about 0.7 ppg to about 1 ppg, from about 0.8 ppg to about 1 ppg, or from about 0.9 ppg to about 1 ppg. As another example, the concentration of the first amount of BP 150 in a fracturing fluid may range from about 0.01 ppg to about 0.9 ppg, from about 0.01 ppg to about 0.8 ppg, from about 0.01 ppg to about 0.7 ppg, from about 0.01 ppg to about 0.6 ppg, from about 0.01 ppg to about 0.5 ppg, from about 0.01 ppg to about 0.45 ppg from about 0.01 ppg to about 0.4 ppg from about 0.01 ppg to about 0.35 ppg, from about 0.01 ppg to about 0.3 ppg, from about 0.01 ppg to about 0.25 ppg, from about 0.01 ppg to about 0.2 ppg, from about 0.01 ppg to about 0.15 ppg, from about 0.01 ppg to about 0.1 ppg, or from about 0.01 ppg to about 0.05 ppg. With the benefit of this disclosure, one of ordinary skill in the art will be readily able to prepare a fracturing fluid having a sufficient concentration of BP for a given application.

With continued reference to FIG. 4, the first amount of BP 150 is present in any fracturing fluid in a range of about 1% to about 10%, preferably in a range of about 3% to 6%, by weight of the total weight of proppants placed in the fracture 100.

It should be clearly understood that the example fracturing fluids illustrated by FIGS. 2-4 are merely general applications of the principles of this disclosure in practice, and a wide variety of other examples are possible. Therefore, the scope of this disclosure is not limited in any manner to the details of FIGS. 2-4 as described herein.

In some examples, the fracturing fluids may comprise the HSP. Examples of the HSP generally include any particulate material having a crush strength of 4000 psi or greater and is sufficient for propping a fracture formed or enhanced in a subterranean formation. Specific examples of the HSP may include, but are not limited to, high-quality sand; particulate garnet; metal particulates; ceramic proppants; aluminum oxide; bauxite; bauxitic clay; kaolin; alumino-silicates; iron oxide, and other ores or minerals; cement; cement composites; ceramics; polymer composites containing particulate materials, such as nanoparticles; porous ceramics; porous organic materials; porous metals; composites thereof and any combination thereof. In a preferred example the HSP is a ceramic or ceramic composite material. The HSP may be any shape (e.g., the HSP may be substantially or partially spherical in shape, substantially or partially round in shape, cylindrical, fibrous, polygonal shaped (such as cubic), irregularly shaped, and any combination thereof). For the benefit of this disclosure, the most important property of the HSP is crush strength, and specifically that the HSP does not crush under the same fracture stresses that induce crushing of the LSP.

In some examples, the fracturing fluids may comprise the LSP. Examples of the LSP generally include any particulate material having a crush strength of less than 4000 psi and is sufficient for propping a fracture formed or enhanced in a subterranean formation. Specific examples of the LSP may include, but are not limited to, low-quality sand, nut shell pieces, seed shell pieces, fruit pit pieces, wood, silica, barite, meta-silicate, calcium silicate, kaolin, talc, zirconia, boron, fly ash, hollow glass microspheres, composites thereof, and any combinations thereof. In a preferred example, the LSP is a frac sand of low quality. The LSP may be any shape (e.g., the LSP may be substantially or partially spherical in shape, substantially or partially round in shape, cylindrical, fibrous, polygonal shaped (such as cubic), irregularly shaped, and any combination thereof). For the benefit of this disclosure, the most important property of the LSP is crush strength, and specifically that the LSP crushes over time, and specifically at fracture pressures less than 4000 psi.

In all examples, the HSP comprises a higher density relative to the LSP. The density of the HSP may be in a range of about 2.5 g/cm$^3$ to about 8.5 g/cm$^3$. The density of the LSP may be in a range of about 2.3 g/cm$^3$ to about 3.0 g/cm$^3$. Although the above ranges may overlap for some examples of the HSP and LSP, it is to be understood that the chosen HSP should have a density in range with a lower limit that is higher than that of the upper limit of a density range for the chosen LSP for a given application.

In some examples, the fracturing fluids may comprise the BP. Examples of the BP generally include any particulate material that is buoyant, neutrally buoyant, or near neutrally buoyant and is sufficient for propping a fracture formed or enhanced in a subterranean formation. For example, the BP may have a specific gravity less than about 2.2. In a specific example, the BP has a specific gravity having a lower limit of about 0.95, 1.00, 1.05, 1.1, 1.15, 1.2, 1.25, 1.3, 1.35, 1.4, 1.45, 1.5, 1.55, 1.6, and 1.65 to an upper limit of about 2.2, 2.15, 2.1, 2, 1.95, 1.9, 1.85, 1.8, 1.75, 1.7, and 1.65, encompassing any value and subset therebetween. In another specific example, the BP has a specific gravity of about 1.1. In another specific example, the BP has a specific gravity of about 1.08. In yet another specific example, the BP has a specific gravity of about 1.05. The BP may have a crush strength which overlaps with either the HSP and/or the LSP, however, the HSP and LSP have specific gravities greater than 2.2. In most examples of the BP materials, the BP materials may not crush into fine fragments from the fracture stresses; however, the BP materials may generally deform or flatten under high stress loads and high temperatures. Specific examples of the BP may include, but are not limited to, polymeric materials such as polycarbonates, amides, acrylics, alkyds, allylics, polyolefins, polyimides, polysulfones, polyetherimides, polyamides, polyacrylonitrile, acrylonitrile butadiene styrene, cellulose acetate, cellulose acetate butyrate, polyisoprene rubber, ethylene propylene rubber, butyl rubber, halobutyl rubber, nitrile rubber, polybutadiene rubber, polystyrene butadiene rubber; thermoset nanocomposites (for examples, styrene-ethylvinyl-benzene-divinylbenzene terpolymers, polybutadienes and other polydienes); composites thereof, and any combination thereof. The BP may be any shape (e.g., the BP may be substantially or partially spherical in shape, substantially or partially round in shape, fibrous, polygonal shaped (such as cubic), irregularly shaped, and any combination thereof).

The particle size distribution of the HSP, LSP, and the BP may range from about 400 mesh to about 10 mesh as measured by the US Standard Sieve series. The particle size distribution may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the particle size distribution of the HSP, LSP, and the BP may range from about 400 mesh to about 10 mesh, from about 400 mesh to about 20 mesh, from about 400 mesh to about 40 mesh, from about 400 mesh to about 60 mesh, from about 400 mesh to about 80 mesh, from about 400 mesh to about 100 mesh, from about 400 mesh to about 120 mesh, from about 400 mesh to about 140 mesh, from about 400 mesh to about 160 mesh, from about 400 mesh to about 180 mesh, from about 400 mesh to about 200 mesh, from about 400 mesh to about 220 mesh, from about 400 mesh to about 240 mesh, from about 400 mesh to about 260 mesh, from about 400 mesh to about 280 mesh, from about 400 mesh to about 300 mesh, from about 400 mesh to about 320 mesh, from about 400 mesh to about 340 mesh, from about 400 mesh to about 360 mesh, or from about 400 mesh to about 380 mesh. As another example, the particle size distribution of the HSP, LSP, and the BP may range from about 400 mesh to about 10 mesh, from about 380 mesh to about 10 mesh, from about 360 mesh to about 10 mesh, from about 340 mesh to about 10 mesh, from about 320 mesh to about 10 mesh, from about 300 mesh to about 10 mesh, from about 280 mesh to about 10 mesh, from about 260 mesh to about 10 mesh, from about 240 mesh to about 10 mesh, from about 220 mesh to about 10 mesh, from about 200 mesh to about 10 mesh, from about 180 mesh to about 10 mesh, from about 160 mesh to about 10 mesh, from about 140 mesh to about 10 mesh, from about 120 mesh to about 10 mesh, from about 100 mesh to about 10 mesh, from about 80 mesh to about 10 mesh, from about 60 mesh to about 10 mesh, from about 40 mesh to about 10 mesh, or from about 20 mesh to about 10 mesh.

Generally, the particle size distribution of the LSP should be smaller than that of the HSP to induce flow through the HSP. However, as the LSP crushes over time, the particle size distribution of the LSP will be reduced over time. As such, the LSP may be the same or a similar size to the HSP as its particle size distribution will decrease as it is crushed from fracture stresses. With the benefit of this disclosure, one of ordinary skill in the art will be readily able to prepare a fracturing fluid having a sufficient particle size distribution for the HSP, LSP, or BP for a given application.

The fracturing fluids comprise a base fluid. The base fluid generally comprises an aqueous fluid. Examples of the aqueous fluid may include, but are not limited to, fresh water, brackish water, sea water, brine, produced water—as it is or processed, and any combination thereof in any proportion. Preferred examples of the aqueous base fluids are slickwater aqueous base fluids. As described herein, the term "slickwater," and grammatical variants thereof (e.g., slickwater aqueous base fluid or slickwater base fluid), refers to an aqueous fluid containing a small amount of friction reducing polymer (e.g., polyacrylamide) which does not significantly enhance viscosity. Accordingly, such slickwater base fluids are characterized by a low viscosity.

The fracturing fluids may comprise a curable resin or tackifying agent. In some examples, the HSP, LSP, and/or BP may be coated with the curable resin or tackifying agent prior to or during preparation of the fracturing fluids. The curable resin or tackifying agent may help aggregate the particles and reduce the flow of fines through the proppant pack. The curable resin may be part of a resin system. The curable resin is any compound that is capable of curing (i.e., the process of gaining compressive strength and becoming hard). Preferably, the curable resin cures via a chemical reaction with a curing agent. In some examples, the curable resin may chemically bond with the surfaces of the HSP, LSP, and/or BP. General examples of the curable resin include, but are not limited to, an epoxy, a diepoxy, a furan-based resin, novolak resins, polyepoxide resins, phenol-aldehyde resins, urea-aldehyde resins, urethane resins, phenolic resins, furan/furfuryl alcohol resins, phenolic/latex resins, silicon-based resins, polyester resins, acrylate resins, or any combination thereof. Specific examples of the curable resin may include, but are not limited to, bisphenol A glycidyldiepoxy, glycidyl propyltrimethoxysilane, or any combination thereof. In some examples, the fracturing fluids may comprise a curing agent. The curing agent may induce the curable resin to cure. Generally, the curing agent may be a dimer acid, a dimer diamine, or a trimer acid.

Examples of tackifying agents may include, but are not limited to, polyamides, trimer acids, synthetic acids produced from a fatty acid, a maleic anhydride, an acrylic acid, a polyester, a polycarbonate, a silyl-modified polyamide compound, a polycarbamate, a urethanes, an acrylic acid polymer, an acrylic acid ester polymer, an acrylic acid derivative polymer, an acrylic acid homopolymer, an acrylic acid ester homopolymer (e.g., poly(methyl acrylate), poly (butyl acrylate), poly(2-ethylhexyl acrylate), and the like), an acrylic acid ester co-polymer, a methacrylic acid derivative polymer, a methacrylic acid homopolymer, a methacrylic acid ester homopolymer (e.g., poly(methyl methacrylate), poly(butyl methacrylate), poly(2-ethylhexyl methacrylate), and the like), an acrylamido-methyl-propane sulfonate polymer, an acrylamido-methyl-propane sulfonate derivative polymer, an acrylamido-methyl-propane sulfonate co-polymer, an acrylic acid/acrylamido-methyl-propane sulfonate co-polymer, and any combination thereof.

The fracturing fluids may also contain various other additives including, but not limited to, scale-control additives, surfactants, gel stabilizers, anti-oxidants, polymer degradation prevention additives, relative permeability modifiers, scale inhibitors, corrosion inhibitors, foaming agents, defoaming agents, antifoaming agents, emulsifying agents, de-emulsifying agents, iron control agents, particulate diverters, salts, acids, fluid-loss-control additives, gas, catalysts, clay control agents, dispersants, flocculants, scavengers (e.g., $H_2S$ scavengers, $CO_2$ scavengers, or $O_2$ scavengers), gelling agents, lubricants, breakers, friction reducers, bridging agents, viscosifiers, weighting agents, solubilizers, pH control agents (e.g., buffers), hydrate inhibitors, consolidating agents, bactericides, catalysts, clay stabilizers, breakers, delayed-release breakers, or any combination thereof.

EXAMPLES

The present disclosure may be better understood by reference to the following examples, which are offered by way of illustration. The present disclosure is not limited to the examples provided herein.

Example 1

Figure 5:
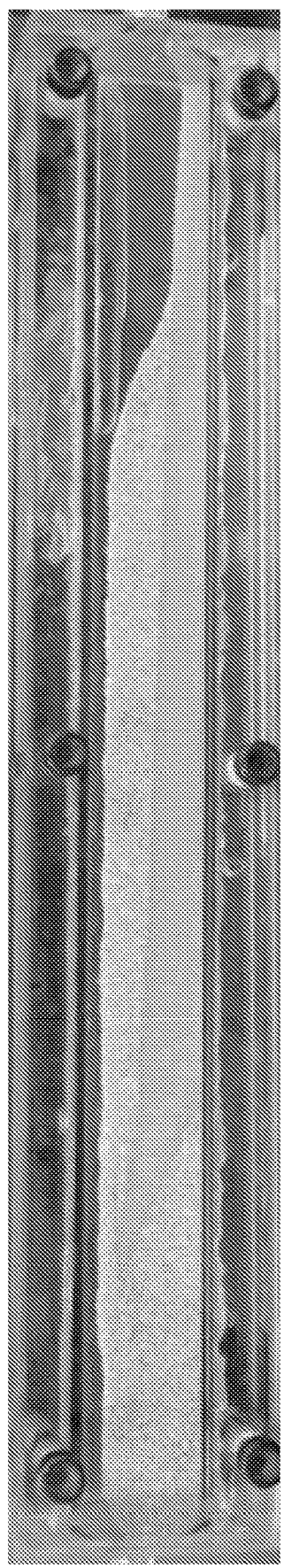
FIG. 5 is a photograph illustrating the packing profile produced from an experimental example in accordance with one or more examples described herein.

An experiment was conducted according to the examples disclosed herein. A first fracturing fluid comprising a first amount of 1 ppg HSP was injected into an apparatus comprising a slot configuration to study the packing profile. The HSP was a 30/50 mesh ceramic proppant having a crush strength greater than 4000 psi. The slickwater base fluid comprised a brine containing a friction reducer at a concentration of 1 gpt. A second fracturing fluid was injected after the first fracturing fluid. The second fracturing fluid comprised 1 ppg of 100 mesh low-quality fracturing sand. A third fracturing fluid comprising a second amount of 1 ppg HSP was then introduced after the second fracturing fluid. The third fracturing fluid comprised the same HSP as the first fracturing fluid. All fracturing fluids were injected at a rate of 60 mL/min. FIG. 5 is a photograph illustrating the packing profile produced from the experiment. As illustrated, the first amount of HSP settles near the slot opening which demonstrates how the first amount of HSP may prevent the mouth (or entrance) of the primary fracture from closing off. The first amount of LSP then settles further into the fracture along a portion of the fracture length and the second amount of HSP settles on top of the first amount of LSP to form the high conductivity layer stretching throughout the fracture length as shown.

It is also to be recognized that the disclosed fracturing fluids may also directly or indirectly affect the various downhole equipment and tools that may contact the fracturing fluids disclosed herein. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the methods and systems generally described above and depicted in FIGS. 1-5.

Provided are methods of propping a fracture in accordance with the disclosure and the illustrated FIGs. An example method comprises introducing a first fracturing fluid into the fracture; wherein the first fracturing fluid comprises a first amount of high crush strength proppant and a first aqueous base fluid; wherein the high crush strength proppant has a crush strength equal to or exceeding 4000 psi. The method further comprises introducing a second fracturing fluid into the fracture; wherein the second fracturing fluid comprises a first amount of low crush strength proppant and a second aqueous base fluid; wherein the low crush strength proppant has a crush strength less than 4000 psi. The method also comprises introducing a third fracturing fluid into the fracture; wherein the third fracturing fluid comprises a second amount of high crush strength proppant and a third aqueous base fluid. The method additionally comprises allowing the first amount of high crush strength proppant, the first amount of low crush strength proppant, and the second amount of high crush strength proppant to settle in the fracture; wherein the first amount of high crush strength proppant, the first amount of low crush strength proppant, and the second amount of high crush strength proppant form a proppant pack in the fracture; wherein the first amount of high crush strength proppant settles adjacent to the wellbore and near-wellbore region; wherein at least a portion of the second amount of high crush strength proppant settles adjacent to and on top of the first amount of low crush strength proppant to form a high conductivity layer in the fracture.

Additionally or alternatively, the method may include one or more of the following features individually or in combination. The method may further comprise introducing a fourth fracturing fluid into the fracture; wherein the fourth fracturing fluid comprises a second amount of low crush strength proppant and a fourth aqueous base fluid. The method may further comprise introducing a fifth fracturing fluid into the fracture; wherein the fifth fracturing fluid comprises a third amount of high crush strength proppant and a fifth aqueous base fluid. The second and/or third fracturing fluid may further comprise a buoyant, neutrally buoyant, or near neutrally buoyant proppant having a specific gravity less than 2.2. The method may further comprise introducing a buoyant proppant fracturing fluid comprising a buoyant, neutrally buoyant, or near neutrally buoyant proppant having a specific gravity less than 2.2 is introduced after the second fracturing fluid and/or after the third fracturing fluid. The high crush strength proppant may be selected from the group consisting of high-quality sand; particulate garnet; metal particulates; ceramic proppants; aluminum oxide; bauxite; bauxitic clay; kaolin; alumino-silicates; iron oxide, and other ores or minerals; cement; cement composites; ceramics; polymer composites containing particulate materials, such as nanoparticles; porous ceramics; porous organic materials; porous metals; composites thereof; and any combination thereof. The low crush strength proppant may be selected from the group consisting of low-quality sand, nut shell pieces, seed shell pieces, fruit pit pieces, wood, silica, barite, meta-silicate, calcium silicate, kaolin, talc, zirconia, boron, fly ash, hollow glass microspheres, composites thereof, and any combinations thereof. The high crush strength proppant may comprise a ceramic and the low crush strength proppant may comprise sand. The high crush strength proppant may comprise a density in a range of about 2.5 g/cm$^3$ to about 8.5 g/cm$^3$; and wherein the low crush strength proppant may comprise a density in the a range of about 2.3 g/cm$^3$ to about 3.0 g/cm$^3$. At least one of the first fracturing fluid, the second fracturing fluid, or the third fracturing fluid may comprise a curable resin and/or a tackifying agent. The first aqueous base fluid, the second aqueous base fluid, and the third aqueous base fluid may comprise a friction reducer.

Provided are systems for propping a fracture in accordance with the disclosure and the illustrated FIGs. An example system comprises a first fracturing fluid comprising a first amount of high crush strength proppant and a first aqueous base fluid; wherein the high crush strength proppant has a crush strength equal to or exceeding 4000 psi. The system further comprises a second fracturing fluid comprising a first amount of low crush strength proppant and a second aqueous base fluid; wherein the low crush strength proppant has a crush strength less than 4000 psi. The system further comprises a third fracturing fluid comprising a second amount of high crush strength proppant and a third aqueous base fluid. The system also comprises a proppant pack disposed in the fracture; wherein the proppant pack is formed from the first amount of high crush strength proppant, the first amount of low crush strength proppant, and the second amount of high crush strength proppant form the proppant pack in the fracture; wherein at least a portion of the second amount of high crush strength proppant settles adjacent to and on top of the first amount of low crush strength proppant to form a high conductivity layer in the fracture. The system additionally comprises mixing equipment capable of mixing the first fracturing fluid, the second fracturing fluid, and the third fracturing fluid; and pumping equipment capable of introducing the first fracturing fluid, the second fracturing fluid, and the third fracturing fluid into the fracture.

Additionally or alternatively, the system may include one or more of the following features individually or in combination. The system may further comprise a fourth fracturing fluid comprising a second amount of low crush strength proppant and a fourth aqueous base fluid; and a fifth fracturing fluid comprising a third amount of high crush strength proppant and a fifth aqueous base fluid. The second fracturing fluid may further comprise a buoyant, neutrally buoyant, or near neutrally buoyant proppant having a specific gravity less than 2.2. The third fracturing fluid may further comprise a buoyant, neutrally buoyant, or near neutrally buoyant proppant having a specific gravity less than 2.2. The system may further comprise a buoyant proppant fracturing fluid comprising a buoyant, neutrally buoyant, or near neutrally buoyant proppant having a specific gravity less than 2.2; wherein the buoyant proppant fracturing fluid is configured in the system to be introduced after at least one of the second fracturing fluid or after third fracturing fluid. The high crush strength proppant may be selected from the group consisting of high-quality sand; particulate garnet; metal particulates; ceramic proppants; aluminum oxide; bauxite; bauxitic clay; kaolin; alumino-silicates; iron oxide, and other ores or minerals; cement; cement composites; ceramics; polymer composites containing particulate materials, such as nanoparticles; porous ceramics; porous organic materials; porous metals; composites thereof and any combination thereof. The low crush strength proppant may be selected from the group consisting of low-quality sand, nut shell pieces, seed shell pieces, fruit pit pieces, wood, silica, barite, meta-silicate, calcium silicate, kaolin, talc, zirconia, boron, fly ash, hollow glass microspheres, composites thereof, and any combinations thereof. The high crush strength proppant may comprise a ceramic and the low crush strength proppant may comprise sand. At least one of the first fracturing fluid, the second fracturing fluid, or the third fracturing fluid may comprise at least one of a curable resin or a tackifying agent. At least one of the first aqueous base fluid, the second aqueous base fluid, or the third aqueous base fluid may comprise a friction reducer.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems and methods can also "consist essentially of" or "consist of the various components and steps." Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations could be made herein without departing from the spirit and scope of the disclosure as defined by the following claims.

What is claimed is:

1. A method of propping a fracture, the method comprising:
    introducing a pad fluid into a wellbore to form or enlarge a fracture;
    introducing a first fracturing fluid into the fracture directly after introduction of the pad fluid; wherein the first fracturing fluid comprises a first amount of a high crush strength proppant and a first aqueous base fluid; wherein the first amount of a high crush strength proppant has a crush strength equal to or exceeding 4000 psi; wherein the first fracturing fluid is a slickwater fluid;
    introducing a second fracturing fluid into the fracture; wherein the second fracturing fluid comprises a first amount of a low crush strength proppant and a second aqueous base fluid; wherein the low crush strength proppant has a crush strength less than 4000 psi; wherein the second fracturing fluid is a slickwater fluid;
    introducing a third fracturing fluid into the fracture; wherein the third fracturing fluid comprises a second amount of a high crush strength proppant and a third aqueous base fluid; wherein the third fracturing fluid is a slickwater fluid;
    allowing the first amount of a high crush strength proppant, the first amount of a low crush strength proppant, and the second amount of a high crush strength proppant to settle in the fracture; wherein the first amount of a high crush strength proppant, the first amount of a low crush strength proppant, and the second amount of a high crush strength proppant form a proppant pack in the fracture; wherein the first amount of a high crush strength proppant settles adjacent to the wellbore and near-wellbore region; wherein at least a portion of the second amount of a high crush strength proppant settles adjacent to and on top of the first amount of a low crush strength proppant to form a higher conductivity layer in the fracture.

2. The method of claim 1, further comprising:
    introducing a fourth fracturing fluid into the fracture; wherein the fourth fracturing fluid comprises a second amount of a low crush strength proppant and a fourth aqueous base fluid; and
    introducing a fifth fracturing fluid into the fracture; wherein the fifth fracturing fluid comprises a third amount of a high crush strength proppant and a fifth aqueous base fluid.

3. The method of claim 1, wherein at least one of the second or third fracturing fluids further comprises a buoyant, neutrally buoyant, or near neutrally buoyant proppant having a specific gravity less than 2.2.

4. The method of claim 1, further comprising introducing a buoyant proppant fracturing fluid comprising a buoyant, neutrally buoyant, or near neutrally buoyant proppant having a specific gravity less than 2.2; wherein the buoyant proppant fracturing fluid is introduced after at least one of the second fracturing fluid or the third fracturing fluid.

5. The method of claim 1, wherein the high crush strength proppant is selected from the group consisting of sand; particulate garnet; metal particulates; ceramic proppants; aluminum oxide; bauxite; bauxitic clay; kaolin; aluminosilicates; iron oxide; ores; minerals; cement; cement composites; ceramics; polymer composites containing particulate materials; polymer composites containing nanoparticles; porous ceramics; porous organic materials; porous metals; composites thereof; and any combination thereof.

6. The method of claim 1, wherein the low crush strength proppant is selected from the group consisting of sand, nut shell pieces, seed shell pieces, fruit pit pieces, wood, silica, barite, meta-silicate, calcium silicate, kaolin, talc, zirconia, boron, fly ash, hollow glass microspheres, composites thereof, and any combinations thereof.

7. The method of claim 1, wherein the high crush strength proppant comprises a ceramic and the low crush strength proppant comprises sand.

8. The method of claim 1, wherein the high crush strength proppant comprises a density in a range of about 2.5 g/cm$^3$ to about 8.5 g/cm$^3$; wherein the low crush strength proppant comprises a density in the a range of about 2.3 g/cm$^3$ to about 3.0 g/cm$^3$.

9. The method of claim 1, where at least one of the first fracturing fluid, the second fracturing fluid, or the third fracturing fluid comprises at least one of a curable resin or a tackifying agent.

10. The method of claim 1, wherein at least one of the first aqueous base fluid, the second aqueous base fluid, or the third aqueous base fluid comprises a friction reducer.

11. A system for propping a fracture, the system comprising:
    a pad fluid for forming or enlarging a fracture;
    a first fracturing fluid comprising a first amount of a high crush strength proppant and a first aqueous base fluid; wherein the high crush strength proppant has a crush strength equal to or exceeding 4000 psi; wherein the first fracturing fluid is introduced into the fracture directly after the pad fluid; wherein the first fracturing fluid is a slickwater fluid;
    a second fracturing fluid comprising a first amount of a low crush strength proppant and a second aqueous base fluid; wherein the low crush strength proppant has a crush strength less than 4000 psi; wherein the second fracturing fluid is a slickwater fluid;

a third fracturing fluid comprising a second amount of a high crush strength proppant and a third aqueous base fluid; wherein the first fracturing fluid is a slickwater fluid;

a proppant pack disposed in the fracture; wherein the proppant pack is formed from the first amount of a high crush strength proppant, the first amount of a low crush strength proppant, and the second amount of a high crush strength proppant; wherein at least a portion of the second amount of a high crush strength proppant settles adjacent to and on top of the first amount of a low crush strength proppant to form a higher conductivity layer in the fracture;

mixing equipment capable of mixing the first fracturing fluid, the second fracturing fluid, and the third fracturing fluid; and pumping equipment capable of introducing the first fracturing fluid, the second fracturing fluid, and the third fracturing fluid into the fracture.

12. The system of claim 11, further comprising:

a fourth fracturing fluid comprising a second amount of a low crush strength proppant and a fourth aqueous base fluid; and a fifth fracturing fluid comprising a third amount of a high crush strength proppant and a fifth aqueous base fluid.

13. The system of claim 11, wherein the second fracturing fluid further comprises a buoyant, neutrally buoyant, or near neutrally buoyant proppant having a specific gravity less than 2.2.

14. The system of claim 11, wherein the third fracturing fluid further comprises a buoyant, neutrally buoyant, or near neutrally buoyant proppant having a specific gravity less than 2.2.

15. The system of claim 11, wherein the system further comprises a buoyant proppant fracturing fluid comprising a buoyant, neutrally buoyant, or near neutrally buoyant proppant having a specific gravity less than 2.2; wherein the buoyant proppant fracturing fluid is configured in the system to be introduced after at least one of the second fracturing fluid or after the third fracturing fluid.

16. The system of claim 11, wherein the high crush strength proppant is selected from the group consisting of sand; particulate garnet; metal particulates; ceramic proppants; aluminum oxide; bauxite; bauxitic clay; kaolin; alumino-silicates; iron oxide; ores; minerals; cement; cement composites; ceramics; polymer composites containing particulate materials; polymer composites containing nanoparticles; porous ceramics; porous organic materials; porous metals; composites thereof; and any combination thereof.

17. The system of claim 11, wherein the low crush strength proppant is selected from the group consisting of sand, nut shell pieces, seed shell pieces, fruit pit pieces, wood, silica, barite, meta-silicate, calcium silicate, kaolin, talc, zirconia, boron, fly ash, hollow glass microspheres, composites thereof, and any combinations thereof.

18. The system of claim 11, wherein the high crush strength proppant comprises a ceramic and the low crush strength proppant comprises sand.

19. The system of claim 11, where at least one of the first fracturing fluid, the second fracturing fluid, or the third fracturing fluid comprises at least one of a curable resin or a tackifying agent.

20. The system of claim 11, wherein at least one of the first aqueous base fluid, the second aqueous base fluid, or the third aqueous base fluid comprises a friction reducer.

* * * * *